Feb. 24, 1942.                I. JEPSON                 2,274,480
                    MOTOR FOR FOOD MIXERS AND THE LIKE
                      Filed July 1, 1940        3 Sheets-Sheet 1

Inventor:
Ivar Jepson
By McCanna, Wintercorn & Morsbach
Attys.

Feb. 24, 1942.                I. JEPSON                    2,274,480
                    MOTOR FOR FOOD MIXERS AND THE LIKE
                    Filed July 1, 1940          3 Sheets-Sheet 3

Inventor:
Ivar Jepson
By McCanna, Wintercorn & Morsbach
Attys.

Patented Feb. 24, 1942

2,274,480

UNITED STATES PATENT OFFICE 2,274,480

MOTOR FOR FOOD MIXERS AND THE LIKE

Ivar Jepson, Chicago, Ill., assignor to Chicago Flexible Shaft Company, Chicago, Ill., a corporation of Illinois Application July 1, 1940, Serial No. 343,327

28 Claims. (Cl. 171—229)

This invention relates to electric motors and more particularly to fractional horse power motors constituting the prime mover of domestic appliances such as food mixers and the like, and has special reference to the structural characteristics of the casing and the speed control mechanism, and the co-relation of these features.

A serious problem in the manufacture of certain domestic appliances, particularly household mixers, is that of incorporating into the casing of the motor unit all of the elements necessary to the proper functioning of the device, and getting them into the proper functional relationship without unduly expanding the casing or producing an unsymmetrical design, or without reducing the portability of the unit and otherwise impairing its usefulness. Much ingenuity has been directed in the past toward the accomplishment of this result, but these efforts have not been entirely successful. An important object of the present invention is, therefore, the provision of a motor structure having improved characteristics whereby to accomplish this result.

Another object of my invention is to provide a motor structure of the character described in which the parts have a new and improved functional relationship which promotes more efficient operation.

Another object is to improve the construction of motors of this type with a view to reducing to a minimum the need for adjustments and repairs and to so constructing and arranging the parts that they may be assembled, tested, replaced, and repaired with greater facility whereby to reduce maintenance and repair costs.

I have also provided an improved design and construction of the character described for the purpose of enabling manufacture at less initial cost.

A further object of the invention is the provision of a motor having an improved casing construction.

A still further object of the invention is the provision of a motor having improved centrifugal speed control mechanism and improved means for incorporating the same in the motor casing.

A further object of the invention is the provision of an improved control knob carried on the casing in a novel indicia indicating relation and having improved functional relationship with the motor and governor parts.

Other objects and advantages will appear from the following description and the accompanying drawings, in which—

Figures 1, 2, 3:
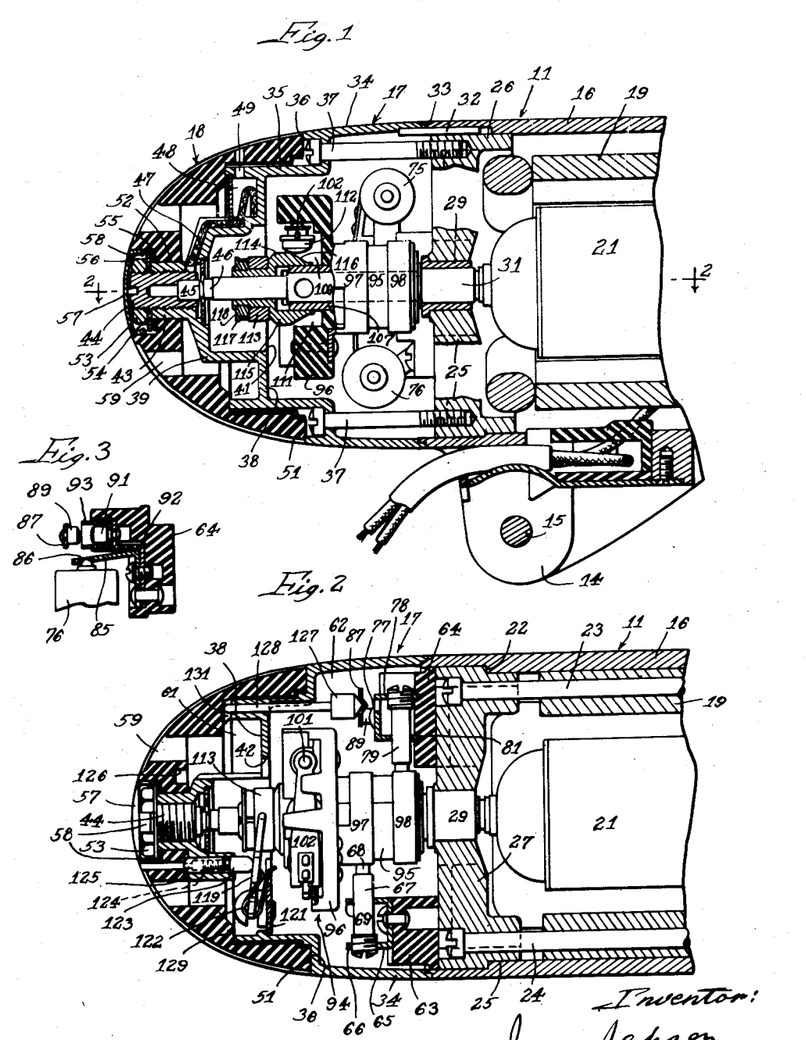
Figure 1 is a fragmentary longitudinal section through the motor taken in a vertical plane.
Fig. 2 is a section on the section line 2—2 of Figure 1.
Fig. 3 is a fragmentary section through the switch and the associated bracket.
Figure 4:
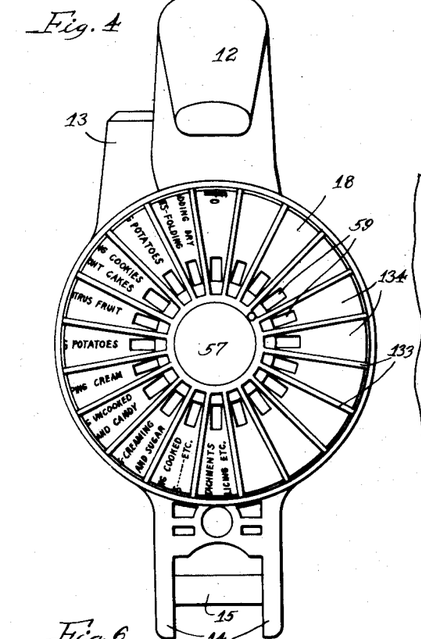
Fig. 4 is a rear view of the motor showing the control knob.
Figure 5:
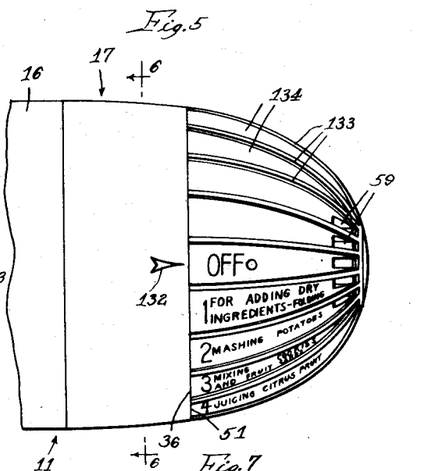
Fig. 5 is a fragmentary side view of the motor.

Referring first to Figs. 1, 4 and 5, the invention is shown as embodied in a well known type of household mixer, which mixer has a motor unit designated generally by the numeral 11 provided with a handle 12 for manual manipulation thereof, an upstanding boss 13 for the reception of attachments adapted to be driven by the motor unit, and spaced depending ears 14 for detachably securing the motor unit to a suitable support for tilting movement about a cross pin 15 to shift the position of the beaters (not shown), which beaters are attached to the forward end of the unit and are driven by the motor.

Figure 6:
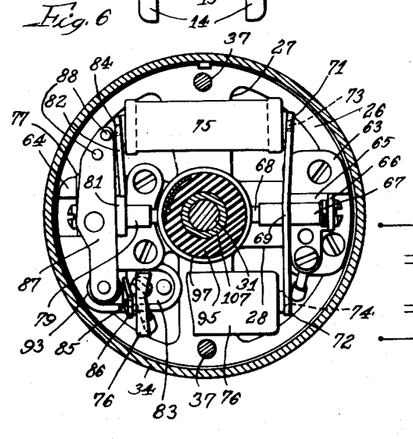
Fig. 6 is a section on the section line 6—6 of Fig. 5 showing the manner in which the resistor and condenser are mounted.

The unit 11 includes a casing structure which surrounds and encloses the moving parts thereof comprising a main section 16, a rear section or cover 17, and an end section in the form of a cap or knob 18. A motor proper is housed within the main section and includes the usual field elements 19 and rotatable armature 21. Positioned within the end of the main section 16 and secured against a shoulder 22 therein by bolts or screws 23 and 24, is a spider 25 having an annular rim 26 and cross bars 27 and 28 (Fig. 6) which carry a bearing 29 at the junction thereof for the support of the armature shaft 31. The forward end of the armature shaft is supported in a suitable bearing (not shown) as is well known in this art. The armature shaft projects rearwardly beyond the bearing 29 to the rear of the motor unit, as will presently be described. The open spaces between the cross bars 27 and 28 allow for the passage of air through the motor chamber for the purpose of cooling the motor. Interposed between the spider and the inner surface of the main section 16 is a key 32 (Fig. 1) which projects beyond the end 33 of the main section and seats in a slot of the rear section 17 for the purpose of properly locating these two sections.

Figure 9:
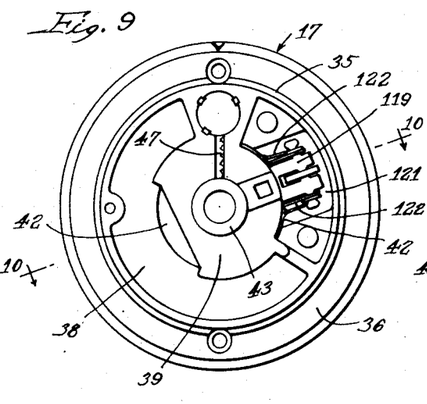
Figs. 9 and 10 are rear and side views, respectively, of the rear cover assembly, removed from the motor.
Figure 10:
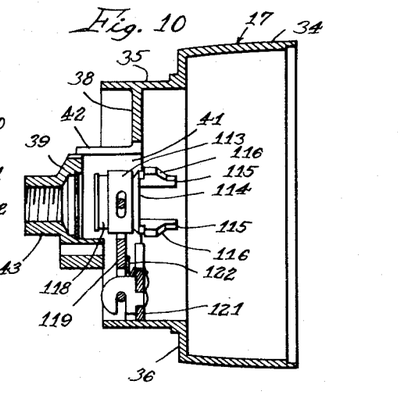

The rear section 17 has a portion 34 conforming in outer curvature to the general curvature of the exterior of the casing, the forward edge of which abuts against the end of the section 16 as shown at 33. Rearwardly of the portion 34 is a cylindrical portion 35 of smaller radius separated from the portion 34 by a transverse annular shoulder 36. The rear section is secured to the spider 25 by means of screws 37 which pass through the annular shoulder 36 as shown in Figure 1. The portion 35 carries an inwardly extending flange 38 extending annularly thereof to which is attached a bridge member 39 which extends diametrically across the central opening 41 between the inner edge of the flange 38, the bridge member providing comparatively large openings 42 on opposite sides thereof for the passage of air. One of these openings indicated at the left in Fig. 9 is wide and unobstructed to provide access to the interior for inspection and setting of the governor actuating mechanism when assembling the units. The bridge member 39 has a rearwardly extending cylindrical bearing portion 43 which is provided with internal threads for the reception of a screw 44 which carries an end thrust bearing 45 adapted to abut against the end of the shaft 31, the end portion thereof being designated by the numeral 46 in Figs. 1 and 2. Lubrication is provided to the end thrust bearing 43 by a wick 47 which extends downward along the outer surface of the bridge member 39, the upper end of said wick being confined within a chamber 48 formed between suitable ribs extending between the cylindrical portion 35 and the bridge member 39, as will be apparent from Figure 1. An oil hole 49 permits replenishing of the lubricant on the wick 47.

The end section on cap 18 is shaped as shown in Fig. 5 so that its outer surface continues the uniform curvature of the motor unit. This cap has a peripheral apron portion extending forwardly over the cylindrical portion 35 and the bridge member 39 and has a forward annular edge 51 abutting against the shoulder 36, the cap being chambered to receive the portion 35 and the bridge member 39. The cap has a hub portion at its rear provided with a central opening 52 through which the bearing portion 43 passes, the cap having bearing support on the bearing portion 43 for rotative movement thereon, the forward edge 51 and shoulder 36 serving to maintain close alignment of the cap on its mounting. The cap is secured in place by a nut 53 threaded on the outer end of the screw 44, which nut acts against a washer 54 seated against the end of the bearing portion 43. A spring washer 55 is interposed between the washer 54 and the cap so as to apply resilient pressure against the cap longitudinally of the motor unit. The end of the screw 44 terminates within a recess 56 in the end of the cap, and the nut 53 and washers 54 and 55 rest within this recess. The recess is closed by means of an arcuate disk 57 provided with spring fingers 58 which grip the inner surface of the recess to retain the disk in place, whereby to completely conceal the fastening means. Because of this construction it will be seen that none of the fastening elements such as the screws 23 and 24, the screws 37 or the screw 44 and associated parts are visible from the exterior of the casing.

The cap 14 is also provided with a plurality of air inlet openings 59 arranged circumferentially of the recess 56, which openings communicate with a space 61 between the cap and the flange 38, thereby permitting the passage of air from the exterior through the openings 59, the chamber 61, the openings 42, a chamber 62 constituting the interior of the end section 17, and thence through the spaces between the cross bars 27 and 28 into the motor chamber. It will be seen that by providing the chamber 61 between the cap and the end section, free admission of air is permitted through all of the openings 59 in any rotative position of the cap. This flow of air is induced by rotating impellers on the governor (described below) which create a low pressure at the entrance openings 42 and force the air past the motor for cooling.

Figure 12:
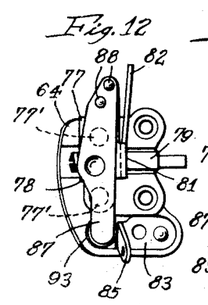
Figs. 12 and 13 are rear and side views, respectively, of the brush and switch assembly, removed from the motor.
Figure 13:
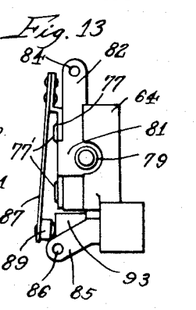
Figure 14:
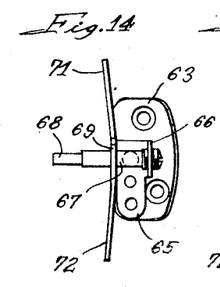
Figs. 14 and 15 are rear and side views, respectively, of the opposite brush assembly, removed from the motor.
Figure 15:
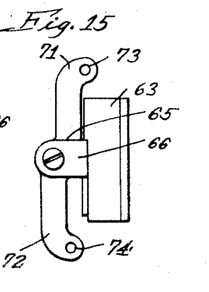

Control mechanism for the motor is positioned within the chamber 62 in cooperative relationship with the spider 25, the cap 18 and the armature shaft 31. This mechanism includes a centrifugal governor with its associated brushes, a resistor and suitable condensers, a switch, and means for actuating the governor and the switch through rotative movement of the cap 18. The governor mechanism shown operates substantially in accordance with the disclosures in Patents Nos. 2,144,733, granted January 24, 1939, for Motor control mechanism, 2,165,858, granted July 11, 1939, for Electric motor, and 2,182,083, granted December 5, 1939, for Mixer motor unit. The governor mechanism herein disclosed is as follows: In Figs. 12 and 14 are shown two separate brush holder assemblies, each mounted on an insulation block. By reference to Figs. 2 and 6 it will be seen that two blocks of insulation material are attached to the spider 25, block 63 being attached thereto at one side of the shaft 31, and block 64 being secured on the diametrically opposed side thereof. Block 63 carries a bracket 65 having a rearwardly disposed ear 66 within which is threaded a tubular brush holder 67 which carries a brush 68 of conventional form. The brush holder 67 passes through and has support in a flange 69 which is integral with the base portion of the bracket 65 midway between its ends, and has an upstanding free end 71 and a depending free end 72 provided with openings 73 and 74, respectively, for the reception of the one end of a resistor 75 and of a condenser 76 to support the same and provide electrical connection therebetween. Block 64 carries a bracket 77 having a base portion suitably fixed to the block as by rivets 77[1]. This bracket has a forwardly turned ear 78 for the support of a brush holder 79 and a forwardly turned flange 81 having an upwardly extending arm 82 provided with an opening 84 for the opposite end of the resistor 75, the space between the end 71 of the bracket 65 and the end 82 of the bracket 77 being slightly less than the length of the resistor so that the resistor is clamped therein under spring pressure. Block 64 also carries at its lower end a bracket 83 having a rearwardly extending end 85 provided with an opening 86 for the reception of the opposite end of the condenser 76, the spacing of this bracket end and the end 72 being such as to clamp the condenser therebetween. A switch lever 87 is attached to the upper end of the bracket 77 as by rivets 88, and consists of electrically conductive spring material, the lever extending downward and carrying a contact 89 (Fig. 3) at its lower end, the contact 89 being positioned to engage a fixed contact 91 carried on a bracket 92 secured along with the bracket 83 and to the block 64. This is a slow-acting switch of novel construction having a sleeve 93 of fibre fixed with respect to the contact 91 and forming a semi-confined chamber about the contact points when the contacts are in circuit-closing position. This feature is the subject matter of an application for patent by Jack Delmonte, Serial No. 346,351, filed July 19, 1940, entitled Slow-acting electric switch with arc quencher.

Figure 7:
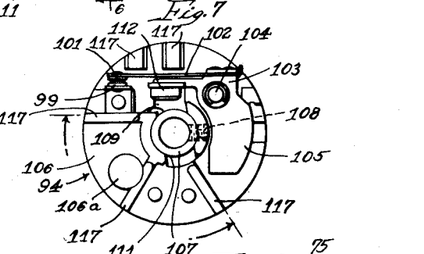
Fig. 7 is a face view of the rotary part of the centrifugal governor, removed from the motor.
Figure 8:
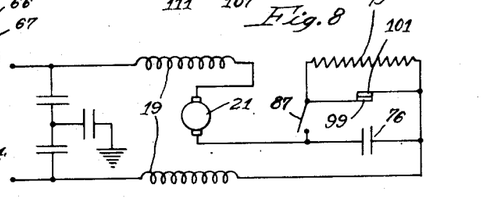
Fig. 8 is a wiring diagram of the motor.
Figure 11:
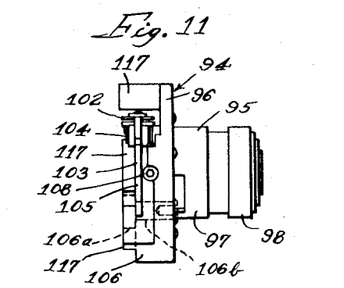
Fig. 11 is a side view of the rotating part of the governor, removed from the motor.

A governor assembly designated generally by 94 (Figs. 7 and 11) is fixed on the armature shaft 31 rearwardly of the bearing 29, this being the rotating part of the centrifugal governor mechanism abovementioned. This includes a governor body preferably of molded insulation material comprising a hub portion 95 and disk portion 96, the hub portion having annular collector rings 97 and 98 adapted for contact by the radially disposed brushes in brush holder 67 and 79 for the transmission of electrical energy therebetween. One of said rings is conductively connected to a contact 99 (Fig. 7) on the rear face of the disk 96, and the opposite ring is connected to a movable contact 101 carried on a flexible bar 102 attached to a lever 103 pivotally carried on a pin 104 on the disk, the lever having a counterbalancing weight 105 in accordance with the disclosure of said patents. The body is attached to the armature shaft by means of a collar 107 and screw 108. The disk has a pair of diametrically opposed slots 109 and 111 for the reception of actuating mechanism presently to be described. A button 112 preferably of insulation material attached to the lever 103 is positioned in spaced relation to the slot 109 and adapted upon rotation of the governor to contact said actuating mechanism and thereby limit movement of the lever 103 under the action of the weight 105.

Referring now more particularly to Figs. 1 and 2, the abovementioned actuating mechanism includes a bearing collar 113 supported on a governor slide 114 which in turn is supported on the rear portion of the armature shaft 31 for sliding axially thereon. A retaining collar 118 on the rear end of the slide 114 keeps the bearing collar 113 in position on the slide. This slide has diametrically spaced fingers 115 projecting forwardly into the slots 109 and 111, each of the fingers having sloping forward cam faces as shown at 116. One of the cam faces 116 is located in co-action with the button 112, depending on which of the two cam faces locates in the slot 109 when mounting the rear cover assembly which carries the governor slide. From this it will be seen that as the governor slide bearing 113 is moved forwardly the cam face 116 will engage the button 12 and move it outwardly according to the position of the governor slide. When the motor is operating this outward movement of the button 112 moves the governor lever 103 in a clockwise direction viewing Fig. 7, against the centrifugal force of the weight 105. This varies at different points the degree of movement of the governor lever 103 and consequently the speed of the armature shaft at which the contacts 99 and 101 will open, as explained in the patents abovementioned. Movement of the bearing collar 113 longitudinally of the shaft is accomplished by means of a yoke 119 which has pivotal support on a plate 121 fixed to the flange 38, the yoke having coiled springs 122 which urges the same in a counterclockwise direction facing Fig. 2, thereby tending to shift the collar 113 rearwardly on the shaft toward increasing speed of the motor. Adjustment of the rotative position of the yoke 119 and consequently the speed of the motor is accomplished by means of an adjustment pin 123 (Fig. 2) having a threaded portion 124 received in a threaded central bore of a cam operated section 125 of the pin, whereby upon relative rotation of the two pin sections, the effective length of the pin may be adjusted. A small key and slot (not shown) between the pin section 125 and the supporting body (portion of the rear cover 17) keeps the pin from rotation in its support. One end of the pin bears against the yoke 119 and the opposite end thereof projects into an arcuate groove 126 of the cap 18, the groove extending annularly and in concentric relation to the bearing portion 43, the bottom surface of said groove forming a cam face sloping so that upon rotation of the cap the pin will be moved longitudinally to rotate the yoke 119.

The switch lever 87 is actuated by means of a button 127 of insulation material carried on a switch rod 128 slidable in an opening in the portion 35 of the rear cover 17, as best shown in Fig. 2. The rear end of said switch rod bears against an annular cam face 129 on the interior of the cap 18, which annular face has a depression as shown at 131 into which the rear end of the switch rod may pass at a predetermined angular position of the cap, under the action of the spring lever 87, thereby allowing the switch contacts 89 and 91 to separate to open the circuit through the motor. It will thus be seen that at a predetermined position of the cap 18, the switch contacts 89 and 91 will be open and the yoke 119 will occupy a predetermined low speed position.

The governor construction is improved in the present invention by eliminating the counterbalancing set of lever parts employed in the form shown in my patents abovementioned, that is, the duplicate set corresponding with the parts 99, 101, 102, 103, 104, 105, and 112 of the present form. As disclosed in my prior patents, this duplicate set of parts did not function to make and break the circuit but it did serve to provide dynamic balance at all speeds of the governor. In the present invention no moving parts, that is, parts moving on the governor disk, are used for effecting dynamic balance. Instead I have provided fixed counterbalancing means on the governor disk located diametrically opposite the center of gravity of the movable lever 103 and so located and proportioned as to give static and dynamic balance when the governor is operated at the maximum set speed. The present motor has controlled speeds between minimum and maximum settings which give beater speeds of 300 R. P. M. for low and 1000 R. P. M. for high, as determined by setting of the control cap or knob 18. This fixed counterbalancing means consists of the enlarged arcuate body portion 106 on the disk 96 covering the area shown by the arrows in Fig. 7, and the metal weight 106ᵃ. This weight 106ª is fixed to the governor body by means of a stem 106ᵇ shown in dotted lines in Fig. 11. By this means the weight 106ª may be set axially with respect to the movable governor parts to obtain dynamic balance at a given speed of rotation of the governor body. I have found that the most critical condition is at the highest speed and I locate the weight 106ª in a set position axially with respect to the governor body to obtain dynamic balance at a predetermined relatively high speed below the maximum speed. In the particular embodiment shown the motor operates at approximately 4000 R. P. M. for low and 13,000 R. P. M. for high speeds and the setting for approximate static and dynamic balance is effected at about 10,725 R. P. M. This effects a saving in cost of manufacture and serves in a satisfactory manner the purposes intended. The governor also constitutes an air impeller and to improve its efficiency I have provided impeller blades 117 thereon, preferably molded with the disk body. These impeller blades create a low pressure area at the opening 42 and cause air to be drawn in through the openings 59 in the control knob and to be forced through the motor for cooling purposes.

Referring now to the speed control knob, my invention contemplates novel means for controlling the speed of the motor in coaction with the functions to be performed by the motor at the selected speeds. As shown in Fig. 5, an arrow 132 or other designating indicia is placed on the motor casing preferably at the highest point. This arrow cooperates with a plurality of ribs 133 and panels 134 therebetween for the purpose of indicating the position of the control mechanism. As shown in Figs. 4 and 5, indicia is placed on the panels 134 between the ribs for the purpose of indicating the speed setting of the knob and also the type or kind of mixer operation adapted to be performed at this particular setting. It will be obserbed that the panels provide comparatively long and wide areas adapted for legible printing or impressing of indicia such as "For adding dry ingredients—folding" and the like, as shown in the panel which bears the number "1". This indicia shows the type of operations to be performed at the first or lowest motor speed setting. Thus, a feature of the invention is the provision of a knob wherein space is provided for the carrying of this indicia and in which the lettering is protected by the ribs 133. These ribs also provide a most effective hand-grip over a large area and give a leverage advantage which greatly facilitates the turning of the knob with the hand. Another function of these ribs is to conceal the openings 59 which terminate in a circle around the plate 57, as will be most apparent from Fig. 4.

It will also be seen that by providing a control knob which extends a substantial distance forwardly from the rear end of the motor, I am enabled to locate the control mechanism in part within the knob so that the mechanism such as the speed control pin 123 and the switch rod 128 may be actuated directly in a straight line from the knob. The control knob also forms a protective casing for the control mechanism and normally closes the same from view or access. Furthermore, I am enabled to obtain substantially improved bearing surface so as to maintain concentricity of the knob upon its rotation. Another feature of the invention in connection with the cotrol knob is the fact that I am enabled to obtain an adequate supply of air for cooling the motor. The knob not only provides the air inlet openings 59 but also an air inlet chamber in conjunction with the rear cover 17 leading to the air openings 42 therein, through which openings the air is drawn in by the impellers 117 on the governor chamber arrangement within the casing and by the provision of the openings 59. It will also be seen that the provision of this knob on the rear cover section 17 permits of ready removal of the knob for inspection, test, and repair of the motor. In this connection an important feature of my invention is the novel relation of parts whereby the motor, the governor, and the actuating mechanism are intact and fully operative for testing when the control knob has been removed. This is particularly advantageous for serving needs. Another feature is that the rear cover section 17 may be easily removed as a unit of assembly, thereby providing access to the governor and the brushes for inspection and replacement, if necessary. A further advantage of this construction is that removal of the control knob and the rear cover unit does not disturb the mounting of the armature shaft or the operativeness of the motor for test purposes.

Among the new results attained by my invention are: The combination of motor parts so constructed and coordinated as to give improved operating efficiency with minimum need for repair or replacement; the novel construction of the units of assembly above described; the new functional relationship of the parts; the provision of a more trouble-free construction which greatly facilitates the work of inspection, repair and replacement incidental to service problems; the new organization of parts in units of assembly such as herein disclosed which promotes economy in initial cost of manufacture; the improved governor construction; the new usefulness of the motor, particularly in the control thereof, whereby the user has instantly available the specific operating indicia for a wide range of uses coordinated with the motor governor for quickly obtaining the most efficient operating speed for the particular work at hand; and the novel control mechanism embodying indicia showing the specific kinds of operating functions to be performed at a large variety of speed settings and the coordination of these functional settings with the governor mechanism, as more fully described above.

While I have thus described and illustrated a specific embodiment of the invention, this is by way of illustration and not limitation, and I do not wish to be limited except as required by the scope of the appended claims, in which—

I claim:

1. In an electric motor structure, a main casing section open at its rear end, a shaft bearing in said rear end, an armature shaft journalled in said bearing having an end portion projecting rearwardly therefrom, a governor for controlling the speed of the motor including a part mounted on and rotating with said projecting shaft portion, a rear cover casing unit removably mounted on the rear end of the main casing providing a protective enclosure for said governor part and having in its rear portion an air inlet passage, said governor including a hollow cone-shaped control member having a supporting hub at its narrow end mounted for rotative movement on the rear cover casing unit and having an apron portion extending forwardly from the hub portion providing a protective enclosure over said air inlet passage, said structure including means for drawing air through said air inlet passage and forcing it through the motor.

2. An electric motor as set forth in claim 1, in which the rear cover casing unit has a diametrically reduced portion at its rear, bolts extending through said reduced portion and threadingly engaged in the main casing section for detachably fastening said unit in position, and in which the apron portion of the control member is arranged to enclose said fastening bolts.

3. An electric motor as set forth in claim 1, in which the main casing section includes a spider member mounted in its rear end carrying said rear bearing in which the armature shaft is journaled, and in which the rear cover casing unit is fastened in position by bolts threaded into said spider member and the apron portion of the control member encloses the fastening bolts.

4. An electric motor as set forth in claim 1, in which the apron portion of the control member extends forwardly over a substantial portion of the rear cover casing unit and provides a peripheral surface having circumferentially spaced panels each containing indicia showing an operating function intended to be performed by the motor at a given speed, said indicia being in cooperative relation to the governor mechanism to co-relate each operating function with the motor speed.

5. An electric motor as set forth in claim 1, in which the rear cover casing unit has a reduced rear end and the hub portion of the control member is mounted for rotative movement on said rear end, the air passage openings in the control member being circumferentially spaced in an area around said hub portion, and enclosed fastening means within said area engaging said reduced rear end for holding the control member in operative position on the rear cover casing unit.

6. An electric motor structure having a main casing and a motor therein, the motor shaft being journalled in a bearing in the rear end of the main casing and having a portion projecting rearwardly beyond said bearing, governor mechanism mounted at the rear end of the main casing including a governor unit mounted on said projecting shaft portion having make-and-break mechanism and collector rings spaced axially of said shaft portion, a brush holder unit for each collector ring, said brush holder units being mounted at opposite sides of the shaft and individually removable without disturbing said governor unit, a rear cover casing unit removably mounted on the rear end of said main casing forming a protective enclosure around said governor unit and said brush holder units and carrying governor actuating means, and a hollow cone-shaped control knob mounted on the rear cover casing unit for rotative movement thereon having a peripheral apron portion providing a protective peripheral casing section, cam means within the protective enclosure of said control knob fixed to rotate therewith, and means coacting between said cam means and said governor actuating means for controlling the speed of the motor in response to the setting of the control knob.

7. In an electric motor structure, a casing, a motor therein, the casing including a peripheral section providing a hand grasp and movable thereby rotatively about the motor axis, said casing section having circumferentially spaced indicia-containing areas on its exterior, and speed control mechanism to control the speed of the motor, said casing section constituting a part of said speed control mechanism adapted to be manually set in different rotative positions to control the speed of the motor in response to the setting, each said area containing indicia showing an operating function of the motor.

8. An electric motor structure as set forth in claim 7, in which the casing section is in the form of a hollow cone-shaped cap enclosing one end of the motor structure, the cap having a central hub portion on which it is mounted for rotative movement and an apron portion comprising said peripheral section, the cap providing an air inlet opening to the interior of the casing, and the structure including means within the casing operated by the motor for inducing a flow of air through said air inlet opening and forcing it through the motor.

9. An electric motor structure having a casing, a motor within the casing, and mechanism for controlling the speed of the motor including a part of the casing, said casing part comprising a hollow cone-shaped cap having a peripheral portion of substantial length enclosing one end of the motor structure, the exterior of said peripheral portion having ribs dividing it into circumferentially spaced and longitudinally extending indicia-containing panels, said cap being mounted for rotative movement about its center upon and with respect to the casing proper, the ribs providing a hand-grip for effecting said cap movement, each panel containing indicia showing an operating function intended to be performed by the motor at a given speed, and said mechanism including means actuated by the cap to control the speed of the motor in response to the setting of the cap.

10. An electric motor structure having a casing open at one end, a motor in the casing having its shaft journalled in a bearing in said open end and projecting outwardly beyond said bearing, and governor mechanism including a governor unit mounted on said projecting shaft having make-and-break mechanism for controlling the supply of current to the motor and including collector rings spaced axially along said shaft, radially disposed brushes for said collector rings individually removable radially without disturbing said governor unit, said casing including a removable casing section carrying an end thrust bearing for said projecting end of the armature shaft, said casing section forming an enclosure for said governor unit and said brushes and removably mounted on the casing proper whereby removal of the casing section gives lateral access to said governor and brushes, said casing section having an air inlet opening to said enclosure, and said governor mechanism including a control knob having a hub portion journalled on the rear end portion of the casing section and a peripheral hand-grip portion extending forwardly to embrace a portion of said casing section and provide a protective enclosure for said air inlet opening therein.

11. An electric motor structure having a main casing, a motor in the casing having its shaft journalled in a bearing in one end thereof and projecting outwardly beyond said bearing, a governor for controlling the speed of the motor including make-and-break mechanism for controlling the supply of current to the motor mounted on said projecting shaft, collector rings spaced axially along said projecting shaft, and radially disposed brushes for said collector rings, said casing including a casing section forming a protective chamber about said make-and-break mechanism and said brushes, said casing section removably mounted on the casing proper and constructed so that its removal gives lateral access to said make-and-break mechanism and said brushes, fastening means extending through the removable casing section for detachably securing it to the casing proper, and said governor including a control cap having a hub portion journalled on the removable casing section and having a peripheral hand-grip apron portion extending forward to provide a protective enclosure over said fastening means.

12. An electric motor structure as set forth in claim 11, in which the cap extends forwardly a substantial distance over the removable casing section and provides peripheral areas of substantial length having circumferentially spaced panels each containing indicia showing an operating function intended to be performed by the motor at a given speed, said indicia panels arranged to co-relate each designated operating function with the intended speed thereof.

13. An electric motor structure having a main casing and a part projecting beyond one end thereof, a motor in the main casing, governor mechanism for controlling the speed of the motor including a hollow cone-shaped cap on said end of the casing having a central hub supported on said projecting casing part for rotative movement thereon and having a peripheral apron portion extending axially of said casing part, ventilation openings in the cap circumferentially spaced around the hub portion adjacent thereto, the apron portion of the cap having a peripheral surface of substantial axial length extending from said ventilation openings to its end remote from its hub portion, said surface having indicia-containing sections circumferentially spaced each containing indicia showing an operating function intended to be performed by the motor at a given speed, and said mechanism including means coacting with the cap to control the speed of the motor in response to the setting of the cap, said indicia sections arranged to co-relate each designated operating function with the speed thereof.

14. An electric motor structure having a casing including a main body having an open rear end and a spider disposed across said open end providing a central bearing and openings for the passage of air, a motor in said main body forwardly of said spider having an armature shaft journalled in said bearing and projecting rearwardly therefrom, said casing also including a rear cover section having a forward end complemental to and abutting the open end of said main body portion and forming with said spider a control chamber, governor mechanism having operating parts in said control chamber for controlling the speed of the motor and including a part driven by said projecting armature shaft, said rear cover section having a rearwardly disposed portion provided with an air inlet opening, attachment means for securing said rear cover section to the rear end of the casing, said governor mechanism including a control member comprising a cap section provided with a hub portion rotatably seated on the rear cover section and a peripheral apron portion extending forwardly therefrom shaped to conceal said attachment means, indicia on the outer surface of the apron portion of the cap section showing the operating functions of the motor between minimum and maximum speed settings, the cap section shaped to allow air passage to said air inlet opening, and the structure having means to induce flow of air to the motor through said opening.

15. An electric motor structure having a casing, a motor therein, a removable casing extension mounted on the rear end of the casing proper and provided with a plurality of air inlet openings in its rear portion, a hollow cap having a hub portion supported for rotative movement on said casing extension and having a peripheral apron portion extending forwardly from said hub portion over a peripheral portion of said casing extension, said apron portion of the cap section having an outer surface symmetrical with the outer surface of said casing extension, forming a rounded end for the motor structure, a plurality of ribs on said outer surface of said cap section spaced circumferentially and extending longitudinally of the motor, the cap section shaped to provide air passage to said air inlet openings, said ribs serving to divide said cap section into segments for measuring the degree of rotative movement of the cap section and serving also to provide a hand-grip surface, and speed control mechanism for the motor of which said cap section is a manually operable control member.

16. An electric motor structure having a casing structure, a motor therein, the casing structure having a rearward extension provided with an annular shoulder substantially forward of its rear end portion, an end cap section having a central hub portion mounted for rotation on said rear end portion of said extension and having a peripheral apron portion extending forwardly from the hub portion over said extension and having bearing support against said annular shoulder for guiding the end cap section, a plurality of exterior ribs on said apron portion dividing the outer surface thereof into segments for measuring the degree of rotative movement of the cap section, and speed control mechanism for the motor of which said end cap section is a manually operable control member and the segments thereof indicate speed settings.

17. An electric motor having a rotary shaft, and governor mechanism for controlling the speed of the shaft including control means adapted to be set to effect minimum, maximum and intermediate speeds, a control member rotating with the shaft about a given axis and movable outwardly and inwardly in response to the speed of rotation of the shaft, and counter-balancing means rotating with said movable control member located diametrically opposite from the center of gravity of said member and further so located and proportioned as to give approximate static and dynamic balance when the governor is operated at a predetermined relatively high speed intermediate the minimum and maximum speeds.

18. An electric motor having a casing, a motor therein, and mechanism for controlling the speed of the motor including a control member having a central hub member mounted for rotative movement on the casing and having a peripheral apron portion the outer surface of which provides a hand-grip for said movement and which surface contains indicia showing operating functions intended to be performed by the motor at different operating speeds in response to the rotative setting of said member.

19. An electric motor structure as set forth in claim 18, in which the control member is provided with circumferentially spaced air openings axially through the member intermediate the hub portion and the apron portion.

20. An electric motor structure as set forth in claim 18, in which the control member is provided with circumferentially spaced air openings axially through the member intermediate the hub portion and the apron portion, a cam groove in the inner wall of the member between the hub portion and the air openings and another cam groove in said inner wall at the outer side of said air openings, said control mechanism including switch and speed control elements coacting with said cam grooves.

21. An electric motor structure as set forth in claim 18, in which the control member is of hollow cone shape, and in which the structure has operating parts disposed beyond one end of the casing and the cone-shaped control member provides an enclosure for said parts and for the end of the casing.

22. An electric motor structure having a main casing and a motor therein, the motor shaft being journalled in a bearing in the rear end of the main casing and having a portion projecting rearwardly beyond said bearing, governor mechanism for controlling the speed of the motor including an air impeller mounted on and rotating with said projecting shaft portion, a rear casing unit removably mounted on the rear end of said main casing providing a rearward casing extension and terminating in a reduced supporting portion, the rear casing unit providing a protective chamber for operating parts of the governor mechanism and having an air inlet opening to said chamber, and a hollow cone-shaped control member mounted on the reduced supporting portion of the rear casing unit for rotative movement thereon, the control member shaped to allow air passage to said air inlet opening, the control member being a part of the governor mechanism and having indicia on the outer surface of its apron portion coacting with indicia on the outer surface of the rear casing unit showing operating functions intended to be performed by the motor at different speed settings of the control member.

23. An electric motor structure having a substantially streamlined outer casing composed of a number of sections including a main casing section and a hollow cone-shaped end section, a motor in the main casing section having a shaft projecting therefrom, a governor including operating parts disposed within the enclosure of said cone-shaped casing section and one of said parts mounted on and driven by said projecting shaft, said cone-shaped casing section constituting a manually operable control member for the governor and having indicia on its peripheral surface coacting with indicia on the peripheral surface of the casing structure showing operating functions intended to be performed by the motor at different speeds.

24. An electric motor structure as set forth in claim 23, in which the control member has a central hub portion at its narrow end and an apron portion extending therefrom a substantial distance lengthwise of the casing, the peripheral surface of said cone-shaped casing section having ribs providing circumferentially spaced panels extending lengthwise of said member, certain of said panels containing said indicia adapted for coaction with indicia on the adjoining casing section to show the operating function in response to the setting of the control member.

25. An electric motor structure having a main casing, a motor therein having a motor shaft projecting rearwardly beyond said main casing, a governor for controlling the speed of the motor including an air impeller mounted on and rotating with said projecting shaft, a rear casing unit removably mounted on the rear end of the main casing providing a rearward casing extension and terminating in a reduced supporting portion, said rear casing unit providing a protective enclosure for operating parts of the governor and having an air inlet opening at the rear of its casing extension portion, and a hollow cone-shaped control member nested over the reduced supporting portion of said rear casing unit, means retaining said control member in position on said supporting portion with capacity for rotative movement thereon, the control member shaped to allow air passage to said air inlet opening, the control member being a part of the governor mechanism and having indicia on its outer surface in coaction with indicia on the outer surface of said casing extension showing operating functions intended to be performed by the motor at different speed settings of said control member.

26. An electric motor structure having a main casing, a motor therein having a motor shaft projecting rearwardly beyond said main casing, governor mechanism for controlling the speed of the motor including a governor unit mounted on said projecting shaft having make-and-break mechanism and collector rings spaced axially of said shaft, a brush holder unit for each collector ring, said brush holder units being individually removably mounted on the rear end of the main casing at opposite sides of the shaft, a rear casing unit forming a protective enclosure about said governor unit and said brush holder units, said rear casing unit providing a rearward extension of the main casing and having a reduced rear end portion, a hollow cone-shaped control member nested over said rear end portion and mounted for rotative movement thereon, said control member being a part of the governor mechanism and having indicia on its outer surface coacting with indicia on the casing extension of the casing unit showing operating functions intended to be performed by the motor at different speeds, and said control member coacting with the governor mechanism to co-relate each operating function with the speed setting of said member.

27. An electric motor structure as set forth in claim 26, in which the control member is removable as a unit from the rear casing unit without disturbing the mounting of the latter, and in which the rear casing unit is removable from the main casing without disturbing the governor unit and the brush holder units, and in which removal of the rear casing unit allows access to the brush holders for adjustment or replacement thereof laterally with respect to the motor structure.

28. An electric motor structure having a casing including a main body having an open rear end and a central bearing therein, a motor in said main body having an armature shaft journalled in said bearing and projecting rearwardly therefrom, said casing also including a rear cover section having a forward end complemental to and abutting the open end of said main body portion and forming an enclosure for a control chamber, governor mechanism having operating parts in said control chamber for controlling the speed of the motor, said rear cover section having a rearwardly disposed portion provided with an air inlet opening, said governor mechanism including a control member comprising a hollow cap section provided with a hub portion rotatably supported on the rear cover section and a peripheral apron portion extending forwardly from said support, indicia on the outer surface of said apron portion showing operating speeds of the motor between minimum and maximum speed settings, the cap section shaped to allow air passage to said air inlet opening, and said governor mechanism including means on said projecting armature shaft for inducing flow of air to the motor through said air inlet opening.

IVAR JEPSON.